(No Model.) 3 Sheets—Sheet 2.
J. B. DOUGLAS.
PIPE CUTTING AND THREADING MACHINE.
No. 273,348. Patented Mar. 6, 1883.

Witnesses
Thomas J. Bewley.
J. M. Richmond

Inventor
John B. Douglas.
per Stephen Ustick attʸ

(No Model.)  3 Sheets—Sheet 3.

J. B. DOUGLAS.
PIPE CUTTING AND THREADING MACHINE.

No. 273,348.  Patented Mar. 6, 1883.

Witnesses.
Thomas J. Bewley.
J. K. Richmond

Inventor
John B. Douglas.
per Stephen Ustick atty

UNITED STATES PATENT OFFICE.

JOHN B. DOUGLAS, OF PHILADELPHIA, PENNSYLVANIA, ASSIGNOR TO NEWSHAM, NOCK & DOUGLAS, OF SAME PLACE.

PIPE CUTTING AND THREADING MACHINE.

SPECIFICATION forming part of Letters Patent No. 273,348, dated March 6, 1883.

Application filed February 27, 1882. (No model.)

*To all whom it may concern:*

Be it known that I, JOHN B. DOUGLAS, a citizen of the United States, residing at Philadelphia, in the county of Philadelphia and State of Pennsylvania, have invented a new and useful Improvement in Hand-Power Pipe Cutting and Threading Machines, of which the following is a specification.

The nature of my invention will be fully understood by the following description.

Figure 1:
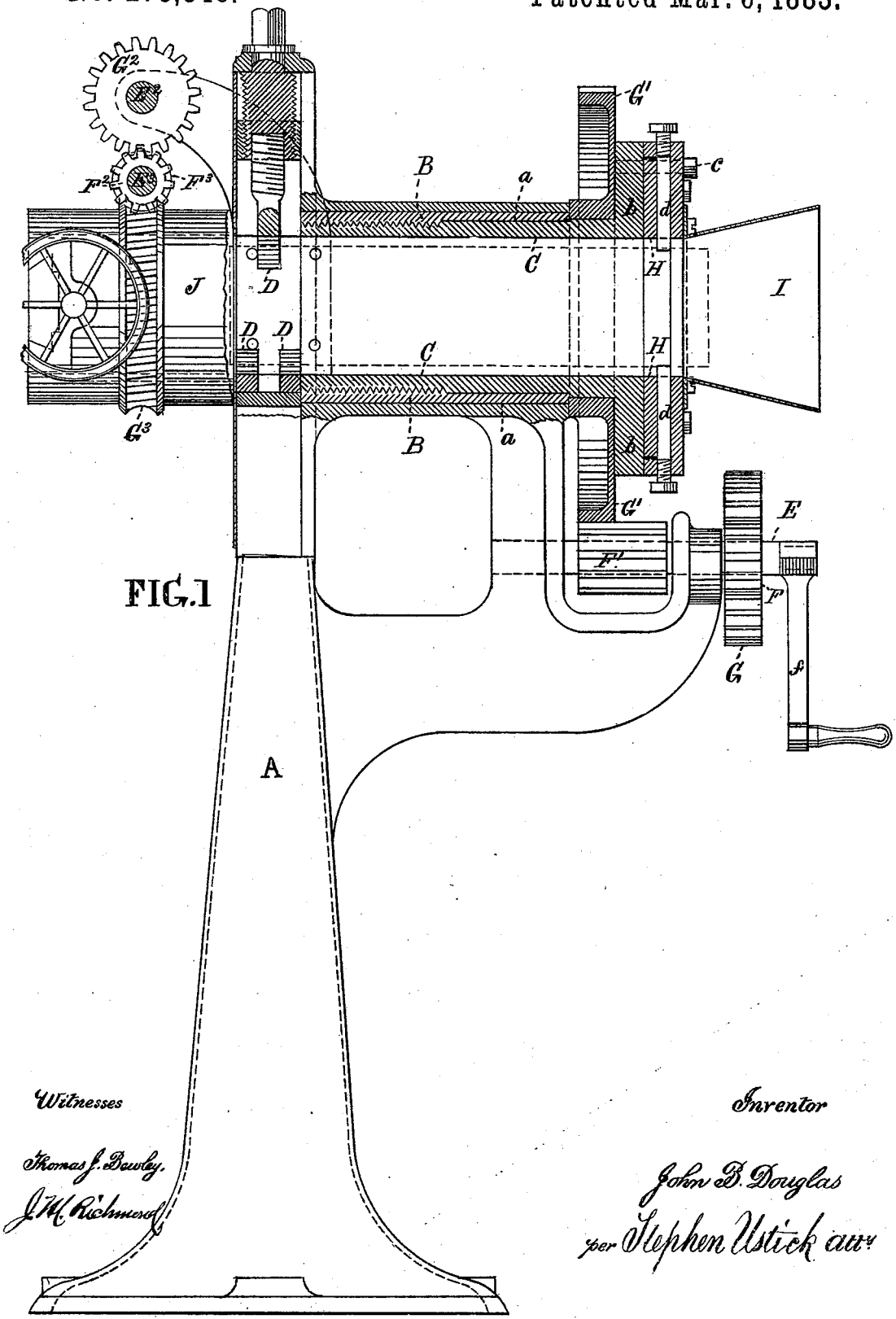
Figure 2:
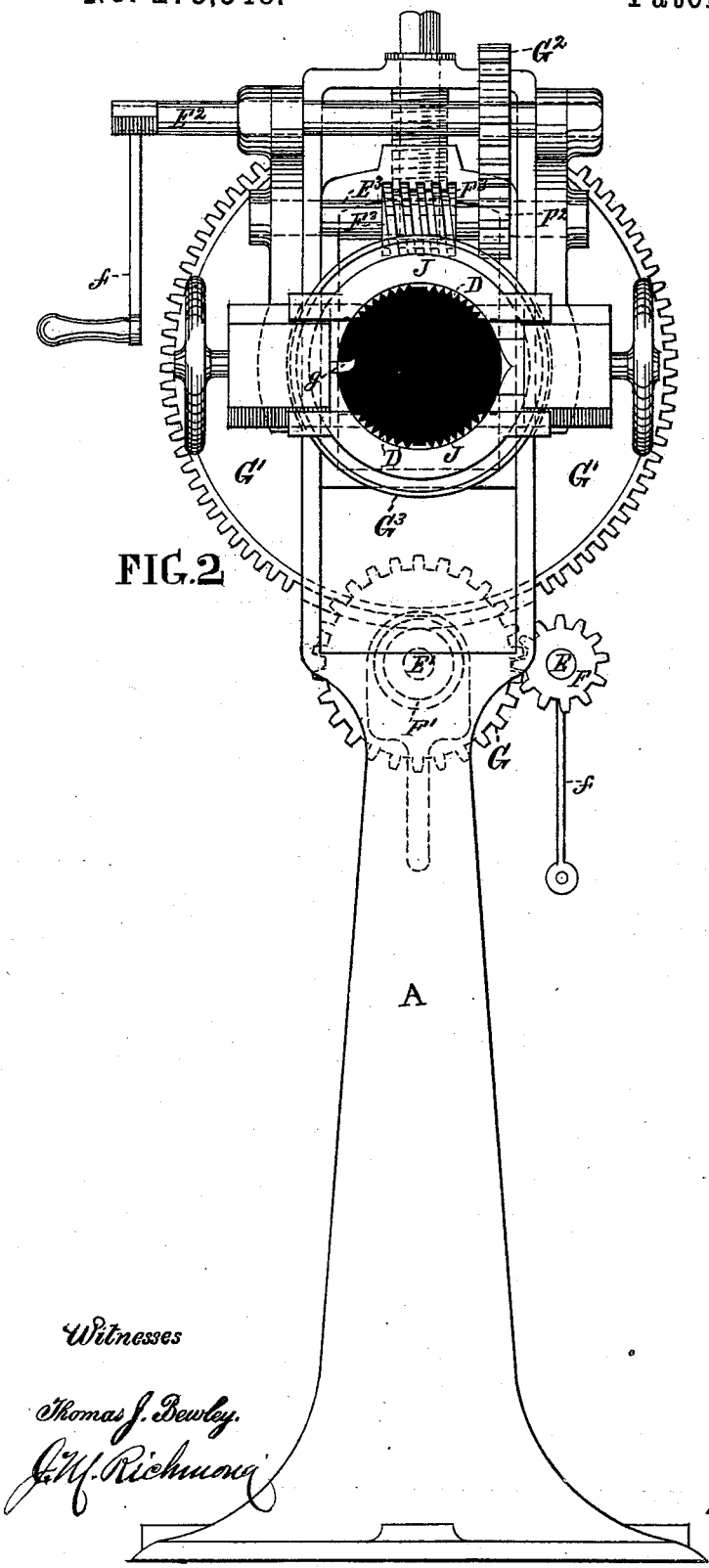
Figure 3:
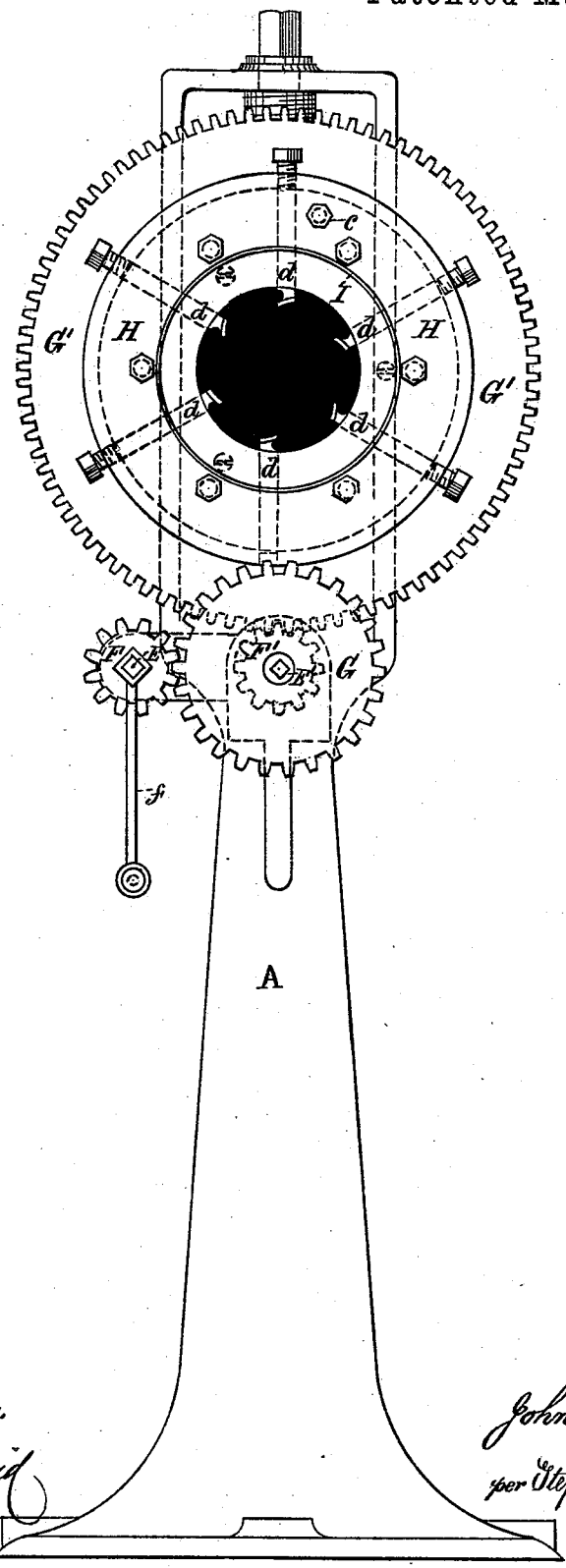

In the accompanying drawings, which make a part of this specification, Figure 1 is a side elevation of my improved machine, partly in section. Fig. 2, Sheet No. 2, is a front elevation of the same. Fig. 3, Sheet No. 3, is a rear elevation.

Like letters of reference in all the figures indicate the same parts.

A represents a pedestal, with which the moving parts of my improved machine are connected. It has a horizontal cylindrical chamber, $a$, which is provided with the bushing B for the purpose of renewal when the screw-thread which connects with the revolving sleeve C wears out. The pipe to be cut and threaded is arranged within the said sleeve, as represented by dotted lines in Fig. 1, and held securely while being cut and threaded by means of the chuck D. (Shown in Figs. 1 and 2.) During the threading operation the sleeve has a longitudinal movement by means of its screw-threaded connection with the bushing B, (shown in Fig. 1,) as it is revolved by means of the driving-shaft E through the following intermediates: the pinion F on said shaft E, the gear-wheel G on the shaft E', pinion F' on the shaft E', and the wheel G' on the front end of the sleeve C, the threading being executed after the cutting off of the rear end of the pipe by means of the cutter $g$ in the revolving cutter-head J, which is revolved by means of the crank-shaft $E^2$ acting through the following intermediates: the spur-wheel $G^2$ on the said shaft E, pinion $F^2$ on the shaft $E^3$, worm-pinion $F^3$ on said shaft $E^3$, and worm-wheel $G^3$ on the cutter-head J. The sleeve C is provided with an annular flange, $b$, to which is hung the die-head H by means of the bolt $c$. The said head has a suitable number of dies, $d$, for threading the pipe, as seen in Fig. 3, as the sleeve is revolved by means of the crank $f$ on the driving-shaft E acting through the train of wheels above described, the longitudinal movement of the sleeve while cutting the thread being given to the sleeve by means of its threaded connection with the bushing B. When the threading of the pipe is completed the crank $f$ is transferred to the square on the end of the shaft E' for giving an increased velocity in the reverse movement of the sleeve for removing the die-head H from the pipe to admit of the head being swung around on the bolt $c$ out of the way for the removal of the pipe. On the front end of the die-head H is connected the annular chute I for the automatic removal of the cuttings from the dies $d$ to prevent them falling into the gearing.

I claim as my invention—

1. In a hand-power pipe cutting and threading machine, the combination of the chuck D, cutter-head J, sleeve C, swinging die-head H, provided with a chute, I, and mechanism, substantially as described, for operating the cutters and dies and giving the reciprocating movements to the sleeve C.

2. The annular chute I, in combination with the die-head H, substantially as and for the purpose set forth.

JOHN B. DOUGLAS.

Witnesses:
THOMAS J. BEWLEY,
STEPHEN USTICK.